J. F. GILDEA.
SPRINKLING APPARATUS.
APPLICATION FILED NOV. 22, 1915.
1,260,764.
Patented Mar. 26, 1918.
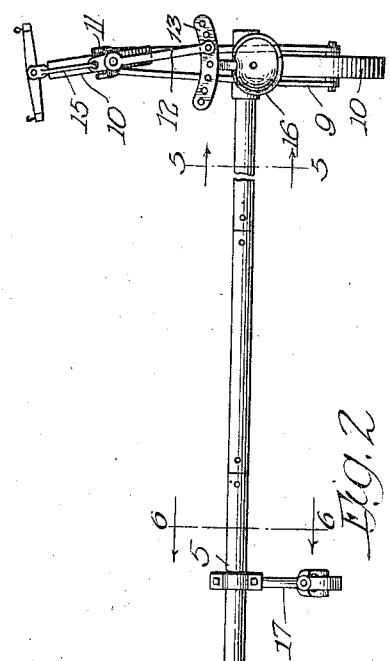
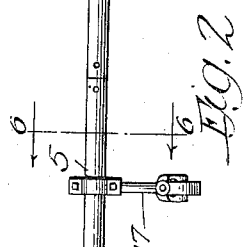
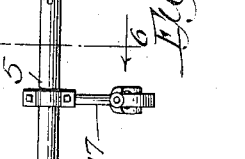
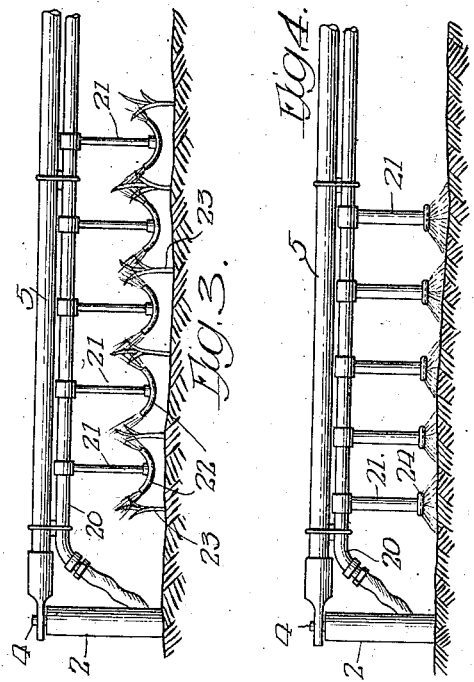
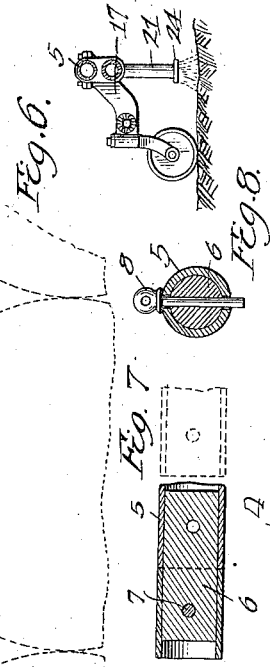
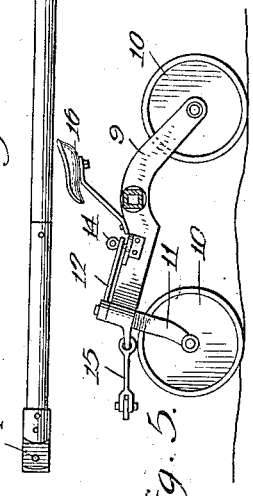
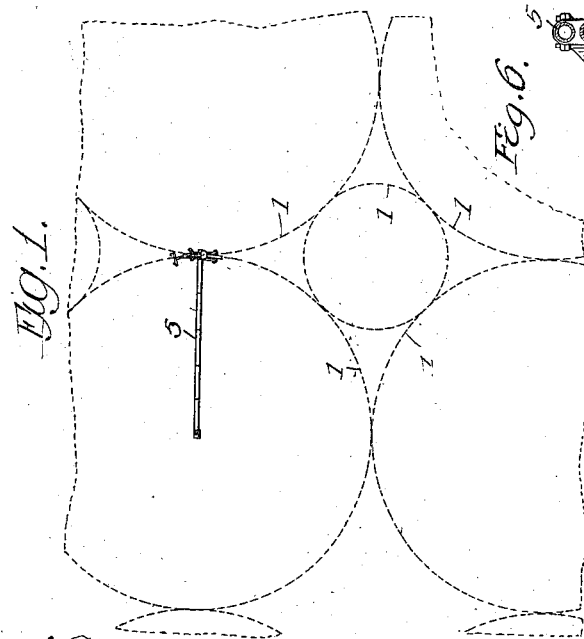

UNITED STATES PATENT OFFICE.

JAMES F. GILDEA, OF CHICAGO, ILLINOIS.

SPRINKLING APPARATUS.

1,260,764.  Specification of Letters Patent.  Patented Mar. 26, 1918.

Application filed November 22, 1915. Serial No. 62,737.

*To all whom it may concern:*

Be it known that I, JAMES F. GILDEA, a citizen of the United States, residing at Chicago, in the county of Cook and State of Illinois, have invented certain new and useful Improvements in Sprinkling Apparatus, as set forth in the annexed specification.

This invention relates in general to agriculture and more particularly to a sprinkling apparatus.

It is the object of my invention to provide an apparatus whereby plants arranged in concentric circles may be supplied with moisture, it being unnecessary for persons or horses to pass between the rows of plants so that sufficient space only need be allowed between the adjacent rows to allow the necessary light and air to reach the plants.

Figure 1 illustrates the layout of an area for cultivation.

Fig. 2 is a plan view of a structure according to my invention.

Fig. 3 is a side elevation of a portion of the invention illustrating nozzles adapted to spray the under side of the leaves of growing plants;

Fig. 4 is a similar view showing nozzles adapted to apply liquid to the soil;

Fig. 5 is a vertical section on the line 5—5 of Fig. 2;

Fig. 6 is a vertical section on the line 6—6 of Fig. 2;

Fig. 7 is a detail in section of the means for connecting the separable sections of the beam, and Fig. 8 is a vertical section through the beam and the connecting member with the fastening means in position.

Referring to Fig. 1 of the drawings, the area to be cultivated is first laid out in a plurality of substantially tangent circles 1 in the center of each of which a post 2 (see Figs. 3 and 4) is erected. The post 2 is provided with a pivot 4 at its upper end, upon which is mounted one end of the beam 5, comprising a plurality of tubular sections, each having a solid member 6 inserted in one end thereof and permanently secured thereto by a pin 7, the end of the solid member 6 being adapted to be inserted in one end of the succeeding section and removably secured thereto by a pin 8.

To the end of the beam 5 remote from the pivot 4 a wheeled support is secured comprising a frame 9 supported on wheels 10. The forward wheel 10 is mounted in the fork 11, pivotally secured to the frame 9, and provided at its upper end with a steering arm 12, the end of which is adapted to be adjustably secured to a quadrant 13 by a pin 14, so that the forward wheel 10 may be so directed as to follow the periphery of the circle described by the end of the beam 5 as it revolves about the pivot 4. Suitable draft means 15 is secured to the forward end of the frame 9, so that a horse or other power-applying means may be attached thereto. A seat 16 for the operator is secured to the frame 9. A wheeled supporting member 17 is secured to the beam 5 substantially midway of its length to prevent sagging thereof.

Secured to the underside of the beam 5 is a pipe 20 adapted to be supplied with liquid from a suitable source. A plurality of pipes 21 are directed downwardly from the pipe 20 and may be provided as in Fig. 3 with upturned T-heads 22 so that the liquid issuing therefrom is directed to the underside of the plants 23. In Fig. 4 I have shown a slightly different form of the invention in which the downwardly directed pipes 21 are provided with spray-heads 24 adapted to supply liquid to the soil for irrigating purposes.

In using my invention after the seeds have been deposited in concentric rows within the circles 1 the beam 5 may be arranged, from time to time as may be necessary, for rotation about the posts 2 in the respective circles, and by applying power to the outer end of the beam it may be caused to swing about its pivot and deliver water for irrigation to the concentric rows of seeds or plants. After the plants have been started the T-heads 22 may be used to deliver liquid to the undersides of the plants whereby vermin may be destroyed.

It will be apparent that various changes may be made in the form, construction and arrangement of the parts without departing from the spirit and scope of the invention or sacrificing any of its material advantages, the form hereinbefore described being merely a preferred embodiment thereof.

I claim:

An apparatus for intensive cultivation comprising an elongated member pivotally mounted to rotate in a horizontal plane and consisting of a plurality of detachable sections, a wheeled support attached to the free end of said member, means for applying power to said wheeled support, a pipe detachably secured to the under side of said member, a plurality of depending distributers communicating with said pipe and means for supplying liquid to said pipe.

JAMES F. GILDEA.

Witnesses:
ERNEST H. MERCHANT,
W. T. WESTERBERG.

Copies of this patent may be obtained for five cents each, by addressing the "Commissioner of Patents, Washington, D. C."